(12) United States Patent
Abuelsaad et al.

(10) Patent No.: US 9,413,833 B2
(45) Date of Patent: Aug. 9, 2016

(54) IDENTITY MANAGEMENT IN A NETWORKED COMPUTING ENVIRONMENT

(71) Applicant: International Business Machines Corporation, Armonk, NY (US)

(72) Inventors: Kelly Abuelsaad, Poughkeepsie, NY (US); Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 13/864,569

(22) Filed: Apr. 17, 2013

(65) Prior Publication Data

US 2014/0317263 A1    Oct. 23, 2014

(51) Int. Cl.
*H04L 29/08* (2006.01)
*H04W 4/00* (2009.01)
*H04W 4/04* (2009.01)

(52) U.S. Cl.
CPC ............ *H04L 67/22* (2013.01); *H04L 67/10* (2013.01); *H04W 4/003* (2013.01); *H04W 4/046* (2013.01)

(58) Field of Classification Search
None
See application file for complete search history.

(56) References Cited

U.S. PATENT DOCUMENTS

| 5,848,396 | A | 12/1998 | Gerace |
|---|---|---|---|
| 5,991,735 | A | 11/1999 | Gerace |
| 7,467,402 | B2 | 12/2008 | Pennington et al. |
| 8,341,711 | B1 | 12/2012 | Pennington et al. |
| 2005/0166065 | A1* | 7/2005 | Eytchison ............... H04L 63/08 713/189 |
| 2009/0300152 | A1 | 12/2009 | Ferris |
| 2012/0131161 | A1 | 5/2012 | Ferris et al. |
| 2012/0265976 | A1 | 10/2012 | Spiers et al. |
| 2012/0266231 | A1 | 10/2012 | Spiers et al. |
| 2013/0102283 | A1* | 4/2013 | Lau ....................... H04W 12/06 455/411 |

OTHER PUBLICATIONS

"Secure, private, and trustworthy: enterprise cloud computing with Force.com", Force.com, Copyright 2010, 6 pages, No authors cited.
"How can I check the user command history in Unix?", Superuser account IDs Gareth & IanH, Aug. 19, 2010, 2 pages.
Maitland, J., "Keeping Control Isn't Easy", Chapter 4: Cloud-Based Infrastructure, SearchCloudComputing.com, 13 pages.
Mell, P. et al., "The NIST Definition of Cloud Computing", National Institute of Standards and Technology, Information Technology Laboratory, Version 15, Oct. 7, 2009, 2 pages.
Maitland, J., "Keeping Control Isn't Easy", Chapter 4: Cloud-Based Infrastructure, SearchCloudComputing.com, Publication Date: Oct. 2009, 17 pages.

* cited by examiner

*Primary Examiner* — Angela Nguyen
(74) *Attorney, Agent, or Firm* — Maeve M. Carpenter; Hunter E. Webb; Keohane & D'Alessandro PLLC

(57) ABSTRACT

An approach for user identity management in a virtualized/networked (e.g., cloud) computing environment is provided. In a typical embodiment, historical command usage within a server environment is analyzed to determine the characteristics of the commands being run against a cloud resource to determine with a confidence rating the likelihood the commands are being executed by a certain user. Such an approach allows for more efficient user identity management in order to optimize cloud security and system administration.

20 Claims, 5 Drawing Sheets

IDENTITY MANAGEMENT IN A NETWORKED COMPUTING ENVIRONMENT

TECHNICAL FIELD

In general, embodiments of the present invention relate to identity management. Specifically, embodiments of the present invention relate to the management of system security and user identification based on command historical analysis in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

One advantage of cloud computing environments is that users and developers have tools to enable the creation and utilization of services in a condensed period of time. As the infrastructures for users to run their workloads in cloud environments continue to grow, identity management tools and services may also play an important role in cloud environment security and administration.

SUMMARY

Embodiments described herein provide an approach for user identity management in a virtualized/networked (e.g., cloud) computing environment. In a typical embodiment, historical command usage within a server environment is analyzed to determine the characteristics of the commands being run against a cloud resource to determine, with a confidence rating, the likelihood the commands are being executed by a certain user. Such an approach allows for more efficient user identity management in order to optimize cloud security and system administration.

A first aspect provides a method for identifying an unknown user in a networked computing environment, the method comprising the computer-implemented steps of: receiving a set of commands; analyzing the set of commands; determining a user style of the unknown user based on the analysis of the set of commands; and performing a matching operation between the user style of the unknown user and a set of profiles of known users, wherein each profile includes a user style associated with each respective known user.

A second aspect provides a system for identifying an unknown user in a networked computing environment, comprising: a memory medium comprising instructions; a bus coupled to the memory medium; and a processor coupled to the bus that when executing the instructions causes the system to: receive a set of commands; analyze the set of commands; determine a user style of the unknown user based on the analysis of the set of commands; and perform a matching operation between the user style of the unknown user and a set of profiles of known users, wherein each profile includes a user style associated with each respective known user.

A third aspect provides a computer program product for identifying an unknown user in a networked computing environment, the computer program product comprising a computer readable storage media, and program instructions stored on the computer readable storage media, to: receive a set of commands; analyze the set of commands; determine a user style of the unknown user based on the analysis of the set of commands; and perform a matching operation between the user style of the unknown user and a set of profiles of known users, wherein each profile includes a user style associated with each respective known user.

A fourth aspect provides a method for deploying a system for identifying an unknown user in a networked computing environment, comprising: providing a computer infrastructure being operable to: receive a set of commands; analyze the set of commands; determine a user style of the unknown user based on the analysis of the set of commands; and perform a matching operation between the user style of the unknown user and a set of profiles of known users, wherein each profile includes a user style associated with each respective known user.

BRIEF DESCRIPTION OF THE DRAWINGS

These and other features of this invention will be more readily understood from the following detailed description of the various aspects of the invention taken in conjunction with the accompanying drawings in which.

Figure 1:
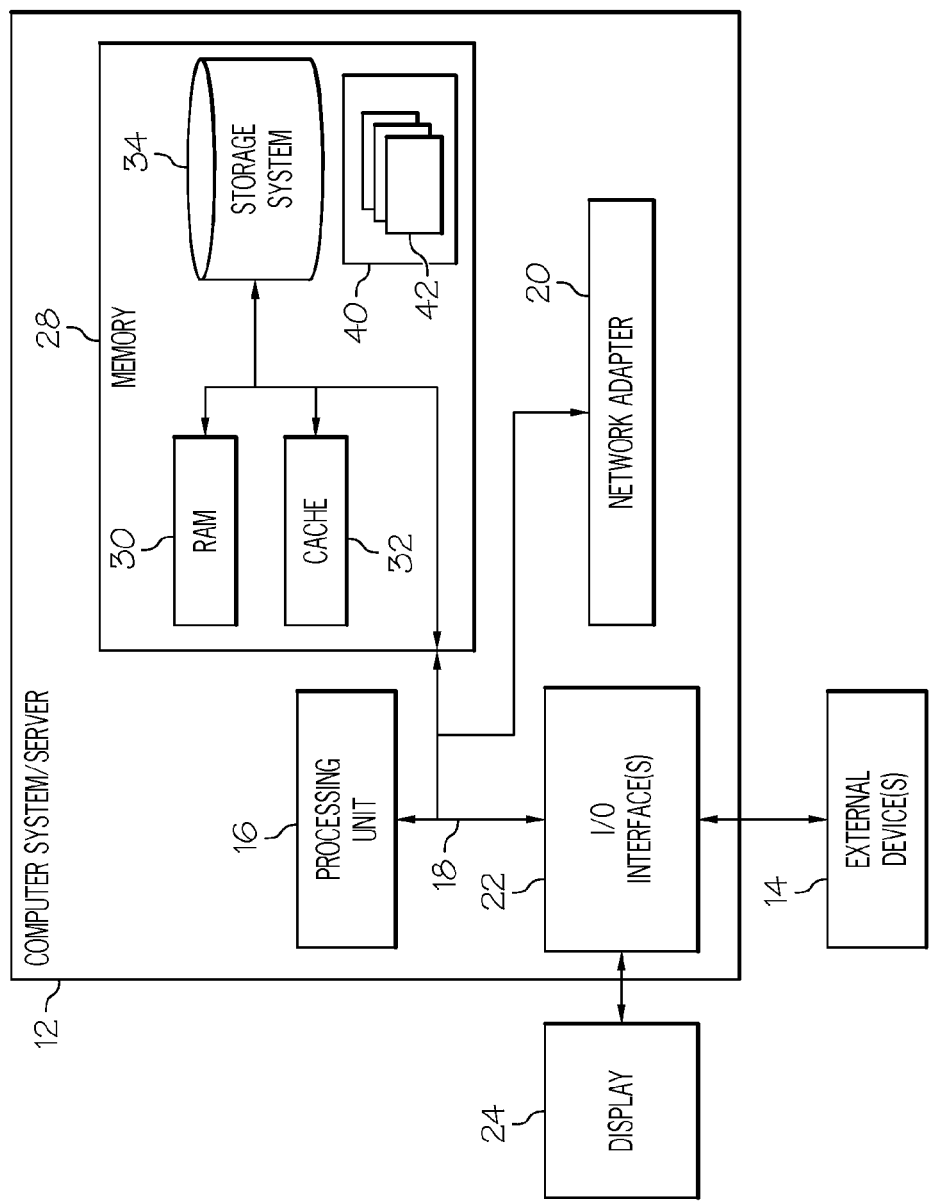
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. As used herein, the term "identity management" is intended to include a set of policies and tools used to identify users of network-based applications and services. The terms "command" and "user command" may be used interchangeably.

As indicated above, approaches for user identity management in a virtualized/networked (e.g., cloud) computing environment are provided. In a typical embodiment, historical command usage within a server environment is analyzed to determine the characteristics of the commands being run against a cloud resource to determine with a confidence rating the likelihood the commands are being executed by a certain user. Such an approach allows for more efficient user identity management in order to optimize cloud security and system administration.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
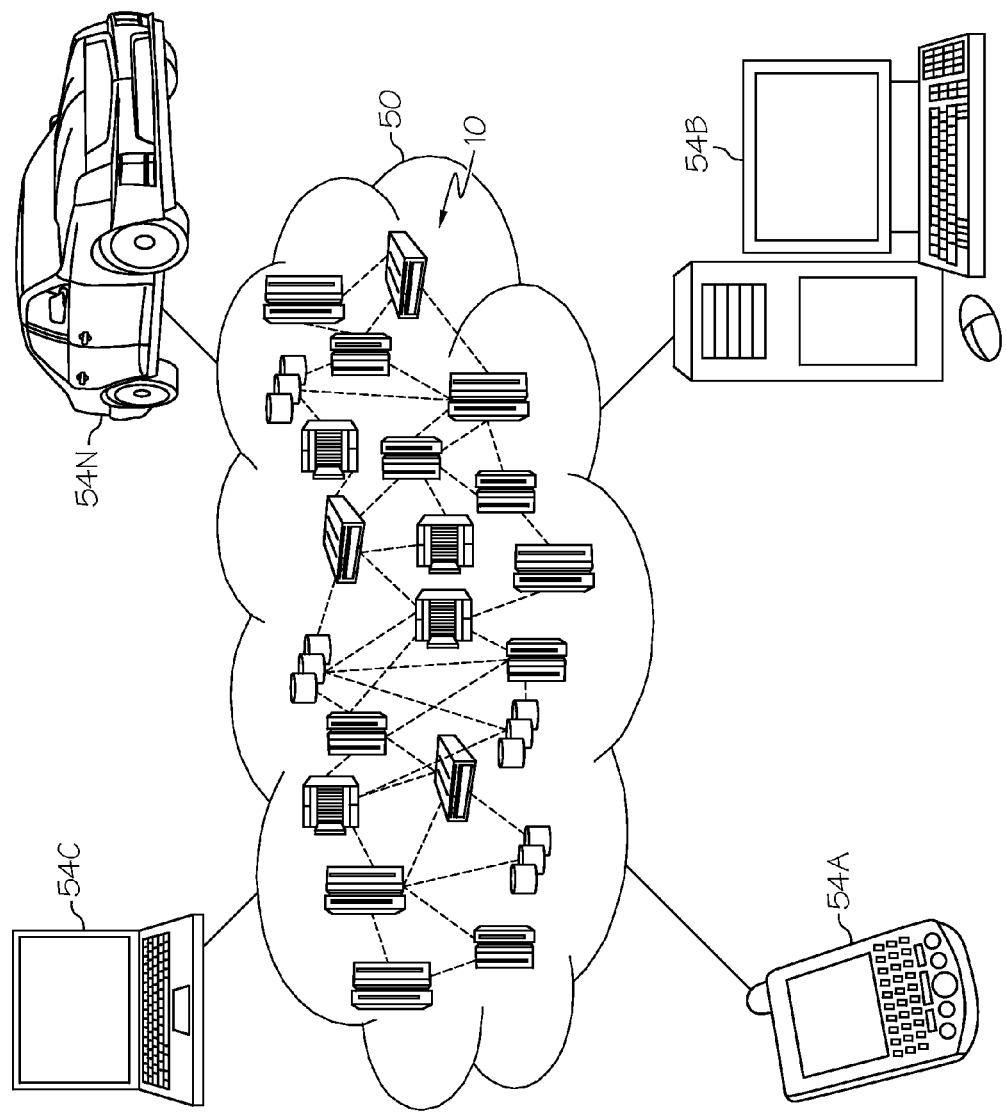
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
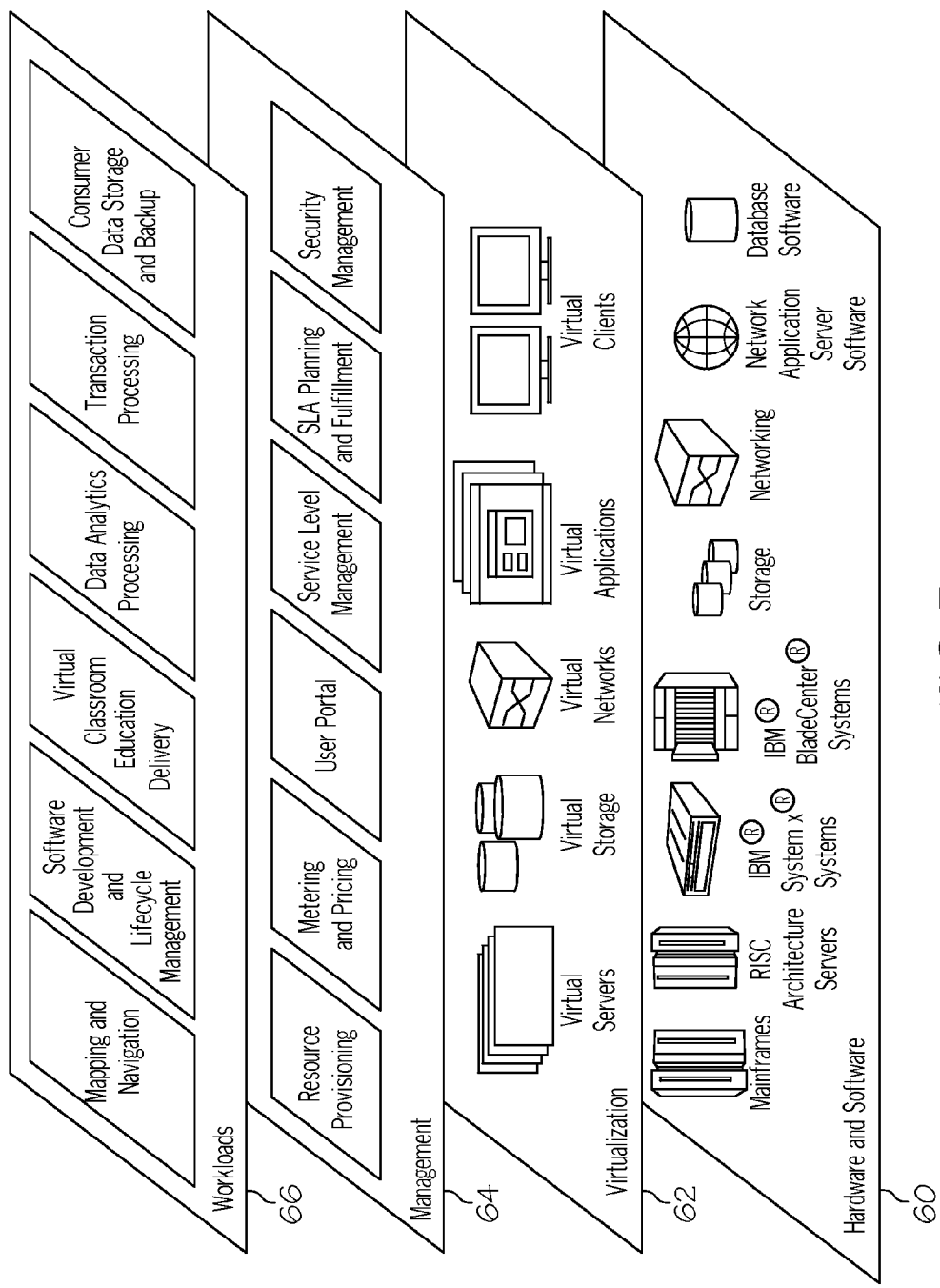
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is identity management, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the identity management functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
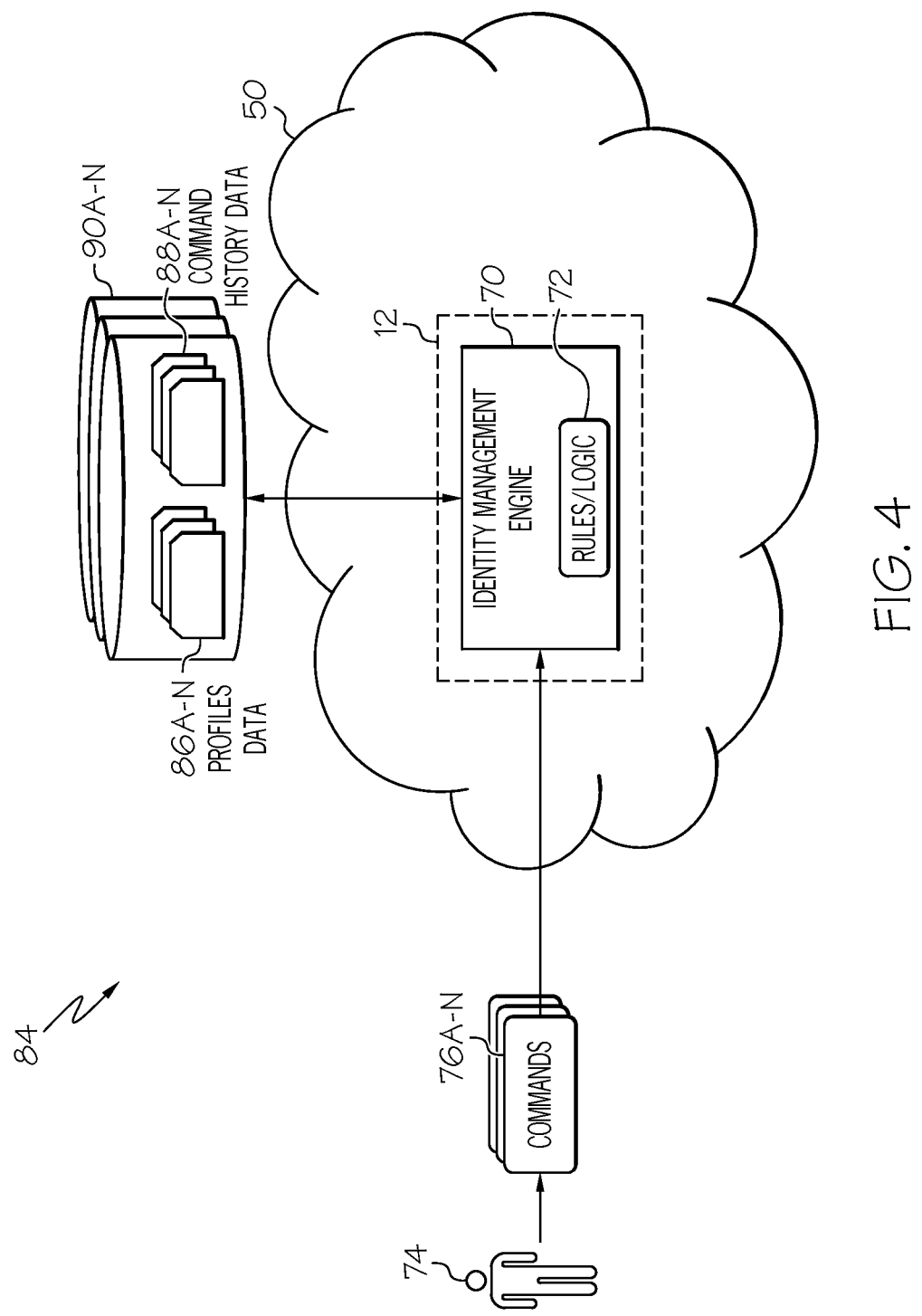
FIG. 4 depicts a system diagram according to an embodiment of the present invention.

Referring now to FIG. 4, a system diagram describing the functionality discussed herein according to an embodiment is shown. It is understood that the teachings recited herein may be practiced within any type of networked computing environment 84 (e.g., a cloud computing environment 50). A computer system/server 12, which can be implemented as either a stand-alone computer system or as a networked computer system, is shown in FIG. 4. In the event the teachings recited herein are practiced in a networked computing environment 84, each client need not have an identity management engine (i.e., engine 70). Rather, engine 70 could be loaded on a server or server-capable device that communicates (e.g., wirelessly) with the clients to provide identity management therefor. Regardless, as depicted, engine 70 is shown within computer system/server 12. In general, engine 70 can be implemented as program/utility 40 on computer system 12 of FIG. 1, and can enable the functions recited herein. As further shown, in one embodiment, engine 70 comprises a rules and/or computational engine that processes a set (i.e., at least one) of rules/logic 72 and provides user identity management hereunder. It is understood that the below rules/logic 72 are intended only as examples of the types of rules and/or logic that could be configured, and that other alternatives may be implemented hereunder.

Along these lines, engine 70 may perform multiple functions similar to a general-purpose computer. Specifically, among other functions, engine 70 may: receive a set of user commands 76A-N from an unknown user 74 within the networked computing environment 84; analyze the user commands 76A-N using rules/logic 72 to determine a user style; perform a matching operation to determine whether the user style matches a profile of a known user stored in profiles data 86A-N; calculate a confidence level based on the matching operation; and store the user commands 76A-N in command history data 88A-N. Profiles data 86A-N and command history data 88A-N may be stored in computer storage device 90A-N.

Profiles of known users may be stored in profiles data 86A-N. The profiles may then be searched when attempting to match an unknown user entering commands into the system 12 to a known user. Each profile data record 86A-N may include, among other things, information associated with a known user, including data identifying the user, and data defining the style of the user (e.g., commands used, frequency of commands used, command options, patterns, nuances, and the like). User styles are discussed in more detail below. Command history data 88A-N may hold a data record for each command entered by a user of the system 12. Data relating to each command that is entered to a particular known user may be included in each data record.

As indicated above, embodiments of the present invention provide an approach for user identity management in a virtualized/networked (e.g., cloud) computing environment. Different types of users may interact with the system 12 within the networked computing environment 84 (e.g., a cloud computing environment 50). Users may include, but are not limited to, system administrators, developers, testers, administrative personnel, and the like. In some cases, the identity of the actual user may not be known. For example, an unknown user may log directly into the system 12 using a generic login (e.g., idcuser in Linux®) or as a different user. (Linux is registered trademark of Linus Torvald.)

In an illustrative example, an unknown user 74 interacts with the system 12 by executing user commands (commands 76A-N) against the system 12. As used herein, a "command" refers to any user instruction (not part of a computer program) that calls for action by the system's executive program. For example, the UNIX® "tail-f" command may be used to view the contents of data files. (UNIX is a registered trademark of The Open Group Corporation.) Each command entered by the user is received at the identity management engine 70 and may be logged in command history data 88A-N for later matching operations and/or auditing. Known techniques exist for the gathering of commands entered by a user.

As shown, commands 76A-N are received at the identity management engine 70, which attempts to identify the unknown user 74. To accomplish this, identity management engine 70 analyzes the commands 76A-N to determine whether the "style" of the unknown user 74 matches a known style of a known user. The term "style" used herein refers to a computer user's particular, distinctive, or characteristic mode of interacting with the system 12.

Rules/logic 72 may define how a style of the unknown user 74 is to be determined. To that end, rules/logic 72 may identify, within the current user session, the specific commands being used, the frequency of the specific commands being used, and/or any nuances or patterns of command execution. The identity management engine 70 may determine the unknown user 74 uses a particular subset of the actual commands that are available on the system 12. The identity management engine 70 may recognize that the unknown user 74 uses one or more commands more frequently than other system commands or order each command used according to frequency of use. The engine identity management 70 may determine nuances or habits of user command execution including attributes and command line options. A command line option (also known as a flag or switch) modifies the operation of a command. The effect is determined by the command's program. Options follow the command name on the command line, separated by spaces. For example, the unknown user 74 may specify the "tail" command return (i.e., display) 200 lines of the data file (tail-f-n200 trace.log) when other users on the system 12 typically return 500 (or more) lines (tail-f-n500 trace.log).

Once a style is determined for the unknown user 74, identity management engine 70 searches profiles data 86A-N to determine whether a match exists with a profile of a known user. If no match is found, one or more additional action steps may be taken to help identify the unknown user 74. In one example, the unknown user 74 may be required to enter personal information for identification purposes. For example, the user may be required to enter the user's name, email address, and/or role. In a second example, the unknown user 74 may be immediately logged out if no profile match is found. In another example, one or more additional security steps may be taken to identify the unknown user 74. For example, the unknown user 74 may be required to enter a username and/or password, receive private key identification, answer one or more security questions, or get manual approval from an administrator. The examples listed are illustrative only and not intended to be limiting. Other means for ascertaining the identity of the unknown user 74, now known or developed in the future, may be used.

If a profile match is found, user information may be written along with the command history to command history data 88A-N. The process of associating a user with each command stored in command history data 88A-N adds a level of security by increasing auditing capabilities of the system 12. For example, the identity of a particular user entering a specific command at an earlier date may be determined by searching the command history data 88A-N.

If a profile match is made, identity management engine 70 may also verify the role of the user. User roles may be stored in a data storage area (not shown). Once the identity of the user is determined, the user role may be retrieved. If the role is allowed by the system 12, the user may be allowed to continue. If the role is not allowed, one or more steps may be required before allowing the user to continue. In one example, one or more actions, such as the actions described above when no profile match is found for the user, may be taken. For example, the user may be logged off, or additional information may be required from the user before begin allowed to continue. The actions described above are illustrative only and not intended to be limiting. In other examples, one or more actions not described herein may be taken.

Furthermore, a situation may exist in which one or more users behave similarly when interacting with the system 12 making it difficult to distinguish between different users when predicting the identity of the unknown user 74. Making a final selection from available candidates may be difficult when the respective styles and usage patterns of multiple known users show that they behave in a similar manner when entering commands. In this case, identity management engine 70 may calculate a confidence level when predicting the identity of the unknown user 74 when the identity cannot be determined with full certainty.

An illustrative example may be used to show the differentiation between two users, e.g., John and Sally. In this example, identity management engine 70 has narrowed the identity of the unknown user 74 from the field of possible candidates down to these two users, but John and Sally behave in a similar manner (i.e., similar style and usage pattern) when entering commands. The commands executed by John are shown below, ordered by the frequency of each command (most frequent at the top of the list):

tail-f-n200 trace.log
 cd/opt
 cd/IBM
 cd/WebSphere
 ls-all

The commands executed by Sally, also ordered by frequency, are shown below:

cd/opt/IBM/WebSphere
 tail-f-n500 trace.log
 startServer.sh server1

While the two users do have similar commands in common, their usage patterns suggest a different style in the way they interact with the system 12. If the unknown user 74 executes a command "tail-f-n200 trace.log," the engine 70 may predict with an 80% confidence level that the user is John.

In some embodiments, the confidence level may be compared against a predefined threshold prior to making a final decision regarding identity. For example, the identity management engine 70 may calculate an 80% confidence level (using the example above) that the unknown user 74 is John. A predefined threshold may be set at 85%, meaning that the identity management engine 70 must calculate a confidence level of at least 85% before the identity of the unknown user 74 is assumed (i.e., set) to be John. Since the threshold has not been met in this example, the identity management engine 70 will conclude that no match has been found. Alternatively, if the predefined threshold is set at 75%, the engine 70 will conclude that John is the unknown user 74.

Additionally, identity management engine 70 may alert other cloud users and/or administrators that an identified user is currently working on the system 12 when the user has been identified. In one example, the alert may be made via a cloud management portal. Alternatively, the cloud management portal may display all users currently working on the system 12. In other examples, the alert may be made by other means.

When an unknown user 74 has been identified, identity management engine 70 may migrate any user aliases and port preferences to the system 12 from a different system on behalf of the user 74. This allows users who spin up or work with multiple resources to be able to use common shortcuts and commands interchangeably.

Once an unknown user 74 has been identified, a profile may be generated for the newly identified user. The profile may be stored in profiles data 86A-N. The profile may then be searched when attempting to match a future unknown user who begins entering commands into the system 12. The profile may include, among other things, information associated with the user, including the user identity, and data defining the style of the user (e.g., commands used, frequency of commands used, command options, patterns, nuances, and the like).

Figure 5:
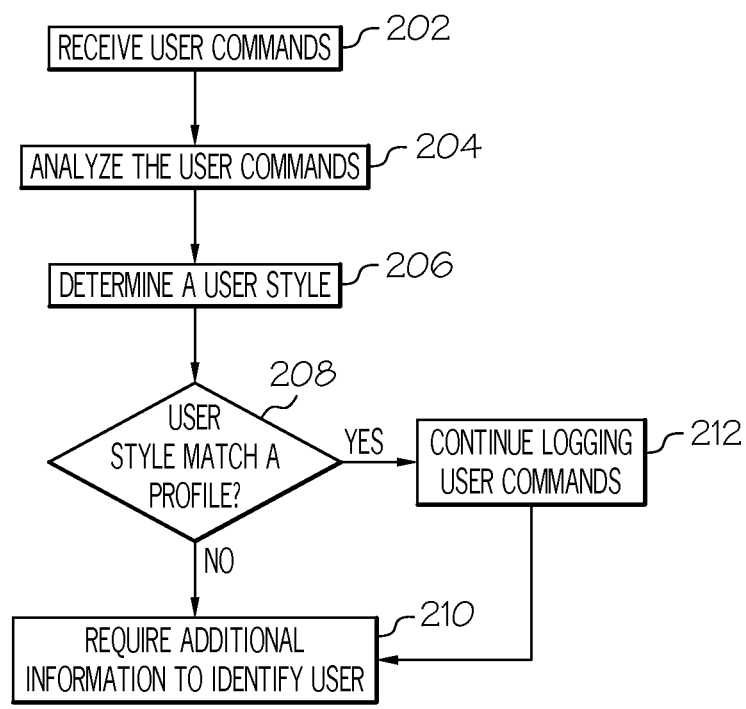
FIG. 5 depicts a method flow diagram according to an embodiment of the present invention.

Referring now to FIG. 5, a flow diagram for identifying an unknown user in a networked computing environment according to embodiments is shown. As shown at step 202, a set of user commands is received from an unknown user in the networked computing environment. At step 204, the user commands are analyzed. At step 206, a user style is determined from the analysis of the user commands. At step 208, a decision is made whether the user style matches a profile of a known user. If no match is made, at step 210, additional information is required to identify the user. At step 212, the user commands are logged. The engine continues to log and/or audit any additional commands entered by the user 74. It should be noted that, in the process flow chart of FIG. 5 described herein, some steps can be added, some steps may be omitted, the order of the steps may be rearranged, and/or some steps may be performed simultaneously.

While shown and described herein as an identity management solution, it is understood that the invention further provides various alternative embodiments. For example, in one embodiment, the invention provides a computer-readable/useable medium that includes computer program code to enable a computer infrastructure to provide identity management functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide identity management functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for identity management. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for identifying an unknown user in a networked computing environment, the method comprising the computer-implemented steps of:
   receiving a set of commands, the set of commands including an alphanumeric string having a command name and a set of command options;
   analyzing the set of commands;
   determining a user style of the unknown user based on the analysis of the set of commands, including detecting a pattern within the set of command options;
   performing a matching operation between the user style of the unknown user and a set of profiles of known users, wherein each profile includes a user style associated with each respective known user;
   returning, in response to the matching operation providing a matching user, a role of the matching user; and
   terminating, in response to the matching operation not providing a matching user, an access of the unknown user to the networked computing environment.

2. The method of claim 1, further comprising the computer-implemented step of calculating a confidence level based on the matching operation.

3. The method of claim 1, wherein the user style is based on the set of commands received and characteristics associated with the set of commands received.

4. The method of claim 1, wherein the set of profiles is based on historical data.

5. The method of claim 1, wherein the networked computing environment comprises a cloud computing environment.

6. The method of claim 2, further comprising the computer-implemented step of allowing the user to continue entering commands when the confidence level exceeds a predefined threshold.

7. The method of claim 2, further comprising the computer-implemented step of implementing at least one action, as set forth in a set of rules, to require the unknown user to provide additional information when the confidence level does not exceed a predefined threshold.

8. A system for identifying an unknown user in a networked computing environment, comprising:
   a memory medium comprising instructions;
   a bus coupled to the memory medium; and
   a processor coupled to the bus that when executing the instructions causes the system to:
      receive a set of commands, the set of commands including an alphanumeric string having a command name and a set of command options;
      analyze the set of commands;
      determine a user style of the unknown user based on the analysis of the set of commands, including detecting a pattern within the set of command options;
      perform a matching operation between the user style of the unknown user and a set of profiles of known users, wherein each profile includes a user style associated with each respective known user;
      return, in response to the matching operation providing a matching user, a role of the matching user; and
      terminate, in response to the matching operation not providing a matching user, an access of the unknown user to the networked computing environment.

9. The system of claim 8, the memory medium further comprising instructions for causing the system to calculate a confidence level based on the matching operation.

10. The system of claim 8, wherein the user style is based on the set of commands received and characteristics associated with the set of commands received.

11. The system of claim 8, wherein the set of profiles is based on historical data.

12. The system of claim 8, wherein the networked computing environment comprises a cloud computing environment.

13. The system of claim 9, the memory medium further comprising instructions for causing the system to allow the user to continue entering commands when the confidence level exceeds a predefined threshold.

14. The system of claim 9, the memory medium further comprising instructions for causing the system to implement at least one action, as set forth in a set of rules, to require the unknown user to provide additional information when the confidence level does not exceed a predefined threshold.

15. A computer program product for identifying an unknown user in a networked computing environment, the computer program product comprising a computer readable storage device, and program instructions stored on the computer readable storage device, to:
   receive a set of commands, the set of commands including an alphanumeric string having a command name and a set of command options;
   analyze the set of commands;
   determine a user style of the unknown user based on the analysis of the set of commands, including detecting a pattern within the set of command options;
   perform a matching operation between the user style of the unknown user and a set of profiles of known users, wherein each profile includes a user style associated with each respective known user;
   return, in response to the matching operation providing a matching user, a role of the matching user; and
   terminate, in response to the matching operation not providing a matching user, an access of the unknown user to the networked computing environment.

16. The computer program product of claim 15, the computer readable storage device further comprising instructions to calculate a confidence level based on the matching operation.

17. The computer program product of claim 15, wherein the user style is based on the set of commands received and characteristics associated with the set of commands received.

18. The computer program product of claim 15, wherein the set of profiles is based on historical data.

19. The computer program product of claim 16, the computer readable storage device further comprising instructions to allow the user to continue entering commands when the confidence level exceeds a predefined threshold.

20. The computer program product of claim 16, the computer readable storage device further comprising instructions to implement at least one action, as set forth in the set of rules, to require the unknown user to provide additional information when the confidence level does not exceed a predefined threshold.

* * * * *